July 9, 1935.    G. GAILUS    2,007,161
VEGETABLE HARVESTER
Filed Dec. 21, 1933
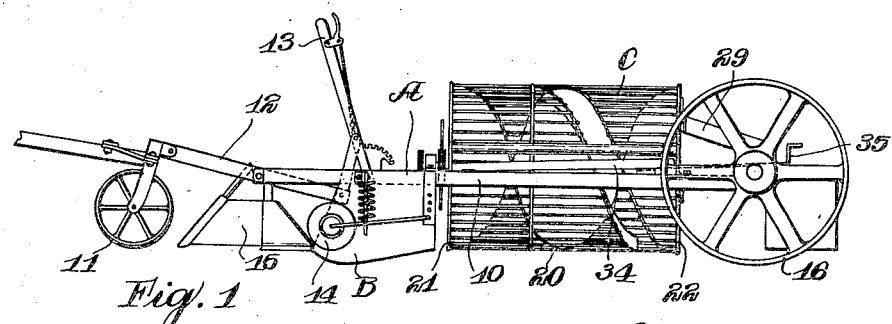
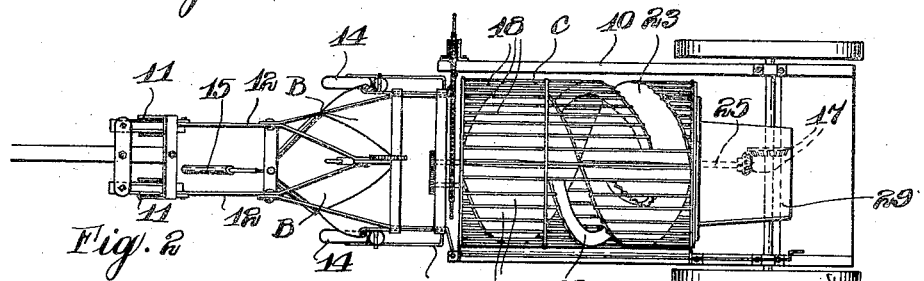
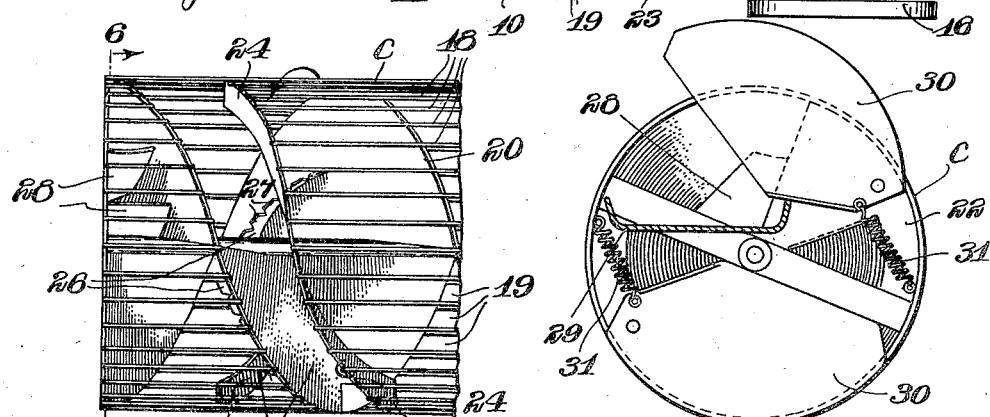
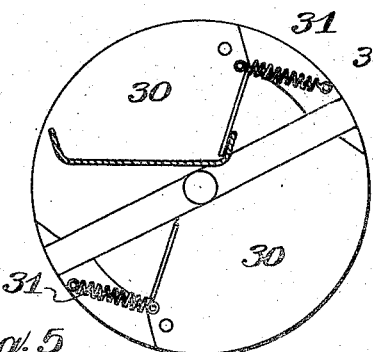
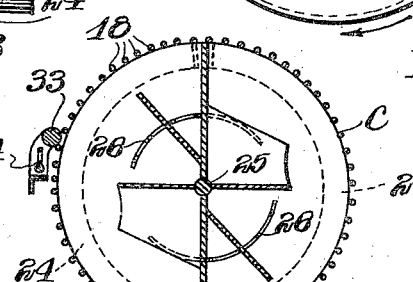
Inventor
George Gailus Patented July 9, 1935

2,007,161

UNITED STATES PATENT OFFICE 2,007,161

VEGETABLE HARVESTER

George Gailus, Stillwater, Minn.

Application December 21, 1933, Serial No. 703,384

11 Claims. (Cl. 55—58)

This is an invention for a potato harvester and the like, where it is designed to remove potatoes or similar vegetables from the ground, separating the dirt and vines from the same. My harvester has a low center of gravity and is provided with a rotary cage made up of a series of spaced apart bars into which the potatoes are carried as they are lifted from the ground by the plows.

It is a feature to provide the rotary cage with openings therein so that the vines may pass out onto the ground through the side wall of the cage while the potatoes are discharged clean out of the rear end of the same.

A further feature resides in providing a rotatable open slatted cage for receiving the potatoes wherein the potatoes are rotated as they are carried through the cage from the front to the back, causing the dirt to be shaken from the same. The cage is provided with a spiral conveyor which causes the vegetables to be carried through the same.

Within the cage and associated with the surface of the conveyor, I provide guards having serrated edges which tend to hold the vegetables down in the bottom of the cage and also act as a means of disengaging the vines from the vegetable roots.

It is a feature to provide automatically operated door means on the rear end of the cage which open in the operation of the harvester to permit the vegetables to be discharged out of the rear of the cage and associated with this end of the same are guard and pocket means which elevate the vegetables from the bottom of the cage up to a chute into which they are discharged after the door automatically opens in the rotation of the elevating cage.

A further feature resides in providing a means for engaging against the outer surface of the cage so as to keep any vegetables from sticking between the bars as the cage is rotated together with wiper means having a flexible element which operates between the bars to keep the cage clean in the rotation of the same.

A still further feature of my potato harvester resides in a vine dividing shoe or vane which is positioned and extends in front of the colter of the plows.

The features and details will be hereinafter more fully set forth.

In the drawing forming part of the specification:

Figure 1 is a side elevation of my potato and vegetable harvester as it would appear in use.

Figure 2 is a plan view of the same.

Figure 3 is a detail of a portion of the receiving rotatable cage.

Figure 4 is a rear end view of the rotatable cage, showing the parts in one position and a portion of the chute in section.

Figure 5 is a similar view to Figure 4, showing the parts in another position.

Figure 6 is a section on the line 6—6 of Figure 3.

My potato harvester A is provided with a longitudinal frame 10 the front end of which is supported by the caster wheels 11 through the adjustable lever beams 12. The beams 12 are adjusted by the hand operated lever 13. I provide wheels 14 on either side of the plows B which carry the rear end of the beams 12 so that the front end of the frame 10 may be raised and lowered to regulate the plows B in the operation of the lever 13.

Directly forward of the plows and slightly to one side of the center of the same, I provide a vertically disposed vine dividing vane 15 which is carried by the front end of the frame of the machine and operates with the adjustment of the front end of the machine to regulate the same in position to the ground line. This vane divides the vines ahead of the scoop plows B.

The rear end of the frame 10 is supported by the wheels 16. Between the sides of the frame 10 and extending longitudinally of the frame I provide a rotatable slatted potato receiving cage C which is driven from the wheels 16 by the gears 17 to rotate the cage as the harvester A is pulled along. The cage C is made up of a series of spaced apart slats 18 so as to provide longitudinal open spaces 19 between the same. The spaces 19 permit the dirt to shake through from the cage C as the harvester operates. This cleans the potatoes or vegetables of any dirt. Within the cage C I provide a spiral conveyor 20 which is secured to the frame and the slats 18 of the cage C and extends from the front open end 21 to the rear closed end 22, of the cage C.

Near the rear portion of the cage C I provide spiral-like open slots 23 which extend for about half of the circumference of the cage C. In the present construction of the harvester A there are two spiral slots or openings 23 in the cage C and which are positioned on opposite sides and at different spiral points so that one is in advance of the other. The slots or openings 23 follow the pitch of the spiral conveyor 20. A guard plate 24 extends along the forward side of the slots 23 so as to prevent the potatoes or other vegetables from dropping out of the slots 23 in the rotation of the cage C. The spiral conveyor 20 extends from the slats to the shaft 25 and upon the surface of the same near the rear portion thereof and projecting therefrom I provide several arcuated guards 26. The guards 26 have a serrated outer edge 27. These guards act to hold the potatoes down in the bottom of the cage C and also tend to sever the vines from the same so that in the rotation of the cage C the vines may be discharged out through the openings 23 onto the ground.

The rear closed end 22 of the cage C is formed with inwardly projecting pockets 28 which operate to pick up the potatoes from the bottom of the cage C and carry the same up to the discharge chute 29. The end 22 is provided with automatically operated doors 30 which are oppositely disposed and which are controlled by the springs 31 to hold the same normally closed. As the cage C rotates one edge of the doors 30 engages against the edge of the chute 29 having passed through a slot in the chute 29 on the other side of the same and as the door 30 is engaged by the chute 29 it will be opened as illustrated in Figure 4, permitting the pocket 28 to discharge the potatoes into the chute 29 which carries the same out of the harvester A. Figure 5 illustrates the doors 30 in closed position.

Extending longitudinally along one side of the rotatable cage C I provide a cleaner roller 33 which rolls against and between the slats 18. Upon the same frame which carries the roller 33, which is also illustrated in Figure 6, I provide a rubber wiper member 34 which extends longitudinally with the roller 33 and which is pivotally mounted so that when it may be desired the handle 35 may be operated to turn the wiper 34 into engagement with the slats 18, thus cleaning the cage C as it rotates, keeping the spaces 19 open.

The roller 33 operates to keep any vegetables from sticking between the slats 18 and also to keep the openings 19 between the slats clean at all times, thus increasing the efficiency of operation of the cage C.

In operation the harvester A is drawn along the row where the vegetables have been planted and the vines or foliage are separated by the vane 15. The plows or scoops B lift the vegetables or potatoes into the cage C of the conveyor 20, forcing the same toward the rear end of the cage C. The cage C may be as long as desired and as the potatoes or vegetables are carried rearwardly in the same by the conveyor, the dirt is shaken from the vegetables while the vines or foliage drop out through the slots 23. As the vegetables reach the rear end of the cage C the doors 30 automatically open and they are discharged out of the chute 29. In this simple and efficient manner my potato harvester operates to discharge the potatoes clean out of the rear end of the harvester. The low center of gravity of my harvester is an important feature in that it does not take much power to operate the same and the efficiency is thus increased.

My harvester is of a very simple, inexpensive construction, operates efficiently and provides a means of harvesting potatoes or other vegetables of a similar nature much more easily than has been accomplished heretofore and I believe more economically as well as giving more satisfactory results through the efficiency of its simple construction which thoroughly cleanses the potatoes of dirt and vines as they pass through the cage C.

I claim:

1. A potato harvester including, a frame, wheels for supporting said frame, a rotatable longitudinally disposed slatted cage for receiving potatoes and the like therein, means for lifting the potatoes from the ground and introducing them into said cage, means for rotating said cage, a spiral conveyor causing the potatoes to be carried from the front to the rear of said cage, slot means in the side of said cage for permitting any vines carried in which the potatoes to be discharged out of the cage, and means for discharging the potatoes out of the rear end of said cage.

2. A potato harvester and the like including, a rotatable longitudinally disposed slatted cage, a conveyor adapted to carry the vegetables and the like from the front to the rear of said cage, and means for forcing inwardly the potatoes caught in the openings between the slats in the rotation of said cage.

3. A harvester for potatoes and other similar vegetables including, means for elevating the vegetables out of the ground, a longitudinally disposed rotatable slatted cage, means for rotating said cage, a spiral conveyor within said cage, and slots in the side wall of said cage through which vines or foliage may be discharged while the vegetables are carried to the discharging end of said cage.

4. A harvester for vegetables of the character of potatoes including, a rotatable slatted receiving member, means for spacing the slats of said rotatable member apart, means for rotating said rotatable member, and means for forcing inwardly the potatoes caught in the openings between the slats during the rotation thereof.

5. A rotatable cleaning cylinder for potato harvesters and the like including, a frame supported by wheels, a series of longitudinally disposed slats extending from one end to the other of said frame around the periphery thereof held in spaced relation by said frame, means co-operating with said slats to force inwardly potatoes caught in the spaces between the same, means for rotating said cylinder, and means for introducing and discharging articles into and from said cylinder.

6. A potato harvester including, a frame, means for adjusting the front end of said frame, a vine and foliage dividing member carried by the front end of said frame, wheels for supporting the rear end of said frame, a rotatable potato cleaning cylinder, disposed between the front and rear of said frame, openings in said cylinder for discharging the dirt out of the same, a spiral conveyor formed in said cylinder, and spiral-like opening means between the ends of said cylinder for discharging foliage and vines out of the same.

7. A potato harvester and the like including, a frame, wheels for supporting said frame, means for adjusting one end of said frame to raise and lower the same, plows carried by the adjusting end of said frame, a rotatable cleaning cylinder carried by said frame having an open receiving end, a closed rear end formed on said cylinder, openings for dropping the dirt from said cylinder, other openings for discharging the vines out of said cylinder, a spiral conveyor in said cylinder, and automatic door means adapted to open the closed end of said cylinder to permit vegetables to be discharged from said cylinder after they have been thoroughly cleaned.

8. A potato harvester including, a frame, wheels for supporting said frame with a low center of gravity, means for adjusting the front end of said frame, plows for lifting the potatoes out of the ground carried by the front end, a cylindrical potato receiving cage, means for rotating said cage when said harvester is operated over the ground, an open end formed on said cage at the front thereof, a closed end formed on the back of said cage, spring door means for closing the back of said cage, and means for automatically operating said doors to open the same in the rotation of said cage.

9. A potato harvester including, an adjustable frame, wheels for supporting said frame, a potato cleaning cage having a cylindrical formation extending longitudinally and rotatably supported by said frame with a low center of gravity, the lower surface of said cage being held in a manner to just clear the ground line, plows for introducing potatoes into one end of said cage, automatic closures for discharging the potatoes out of the rear end of said cage, and openings in the side wall of said cage through which foliage and vines may be discharged in the rotation thereof.

10. A potato harvester and the like including, a rotatable longitudinally disposed cage, a series of dirt openings in said cage, enlarged vine and foliage opening means formed in said cage between the ends thereof, automatically operated closure means for one end of said cage, and means for rotating said cage.

11. A potato harvester and the like including, frame and supporting means, means for adjusting said frame, potato lifting means adapted to elevate the potatoes from the ground, a rotatable cylindrical-like cage mounted with a low center of gravity, means for rotating said cage, a conveyor within said cage, slot means in the side of said cage, and automatically operated door means for closing and opening the rear of said cage.

GEORGE GAILUS.